(12) United States Patent
Zhang et al.

(10) Patent No.: US 6,396,667 B1
(45) Date of Patent: May 28, 2002

(54) ELECTROMAGNETIC DISC DRIVE MICROACTUATOR AND SUSPENSION

(75) Inventors: Lei Zhang, San Jose, CA (US); Peter Crane, Richfield; Roger A. Resh, Prior Lake, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/071,611

(22) Filed: May 1, 1998

Related U.S. Application Data

(63) Continuation-in-part of application No. 09/010,100, filed on Jan. 21, 1998.
(60) Provisional application No. 60/050,669, filed on Jun. 24, 1997, and provisional application No. 60/061,257, filed on Oct. 3, 1997.

(51) Int. Cl.$^7$ .................................................. G11B 5/54
(52) U.S. Cl. .................................................. 360/294.3
(58) Field of Search .................. 360/294.3, 291.9, 360/294.1, 294.4, 294.5, 294.6, 245, 245.3

(56) References Cited

U.S. PATENT DOCUMENTS

| | | | |
|---|---|---|---|
| 4,605,977 A | 8/1986 | Matthews | 360/103 |
| 4,620,251 A | 10/1986 | Gitzendanner | 360/103 |
| 4,651,242 A | 3/1987 | Hirano et al. | 360/103 |
| 4,853,810 A | 8/1989 | Pohl et al. | 360/103 |
| 4,962,391 A | 10/1990 | Kitahara et al. | 346/140 |
| 5,021,906 A | 6/1991 | Chang et al. | 360/103 |
| 5,034,828 A | 7/1991 | Ananth et al. | 360/75 |
| 5,065,268 A | 11/1991 | Hagen | 360/104 |
| 5,072,240 A | 12/1991 | Miyazawa et al. | 346/140 |
| 5,079,659 A | 1/1992 | Hagen | 360/104 |
| 5,105,408 A | 4/1992 | Lee et al. | 369/44.15 |
| 5,189,578 A | 2/1993 | Mori et al. | 360/106 |
| 5,255,016 A | 10/1993 | Usui et al. | 346/140 |
| 5,276,573 A | 1/1994 | Harada et al. | 360/103 |
| 5,552,809 A | 9/1996 | Hosono et al. | 347/10 |
| 5,657,188 A | 8/1997 | Jurgenson et al. | 360/106 |
| 5,745,319 A | 4/1998 | Takekado et al. | 360/78.05 |
| 5,764,444 A | 6/1998 | Imamura et al. | 360/109 |
| 5,781,381 A | 7/1998 | Koganezawa et al. | 360/106 |
| 5,793,571 A | 8/1998 | Jurgenson et al. | 360/104 |
| 5,796,558 A | 8/1998 | Hanrahan et al. | 360/106 |
| 5,805,382 A | 9/1998 | Lee et al. | 360/104 |
| 5,896,246 A | 4/1999 | Budde et al. | 360/104 |
| 5,898,541 A | 4/1999 | Boutaghou et al. | 360/109 |
| 5,898,544 A | 4/1999 | Krinke et al. | 360/104 |

OTHER PUBLICATIONS

"Design, Fabrication, and Testing of Silicon Microgimbals for Super–Compact Rigid Disk Drives" by Temesvary et al, *Journal of Microelectromechanical Systems*, vol. 4, No. 1, Mar. 1995.

"Silicon Micromachined Electromagnetic Microactuators for Rigid Disk Drives" by Tang et al, *IEEE Transactions on Magnetics*, vol. 31, No. 6, Nov. 1995.

(List continued on next page.)

Primary Examiner—George J. Letscher
(74) Attorney, Agent, or Firm—Kinney & Lange P.A.

(57) ABSTRACT

A disc drive has a recording disc rotatable around an axis, a slider supporting a transducing head for transducing data with the disc, and a dual-stage actuation assembly supporting the slider to position the transducing head adjacent a selected radial track of the disc. The dual-stage actuation assembly includes a movable actuator arm, a suspension assembly supported by the actuator arm and including a flexure, a tongue supporting the slider, and a microactuator. The microactuator includes a rotor attached to the tongue and a stator attached to the flexure and operatively connected to the rotor to radially move the rotor with respect to the stator. At least one beam is attached between the slider bond pad and the stator.

23 Claims, 12 Drawing Sheets

OTHER PUBLICATIONS

"Magnetic Recording Head Positioning at Very High Track Densities Using a Microactuator–Based, Two–Stage Servo System" by Fan et al., *IEEE Transactions on Industrial Electronics*, vol. 42, No. 3, Jun. 1995.

"A Flexural Piggyback Milli–Actuator for Over 5 Gbit/in$^2$ Density Magnetic Recording" by Koganezawa et al, *IEEE Transactions on Magnetics*, vol. 32, No. 5, Sep. 1996.

"Transverse Mode Electrostatic Microactuator for MEMS–Based HDD Slider" by Imamura et al, *IEEE* 1996.

"An Experiment for Head Positioning System Using Sub-micron Track–width GMR Head" by Yoshikawa et al., *IEEE Transactions on Magnetics*, vol. 32, No. 5, Sep. 1996.

"Micro Electrostatic Actuators in Dual–Stage Disk Drives with High Track Density" by Tang et al., *IEEE Transactions on Magnetics*, vol. 32, No. 5, Sep. 1996.

"Piezoelectric Microactuator Compensating for Off–Track Errors in Magnetic Disk Drives" by Imamura et al, *Advance Information Storage Systems*, vol. 5, pp. 119–125.

"A Dual–Stage Magnetic Disk Drive Actuator Using a Piezoelectric Device for a High Track Density" by Mori et al., *IEEE Transactions on Magnetics*, vol. 27, No. 6, Nov. 1991.

"Dynamic Loading Criteria for 3–1/2 Inch Inline HDD Using Multilayer Piezoelectric Load/Unload Mechanism" by Kajitani et al., *IEEE Transactions on Magnetics*, vol. 27, No. 6, Nov. 1991.

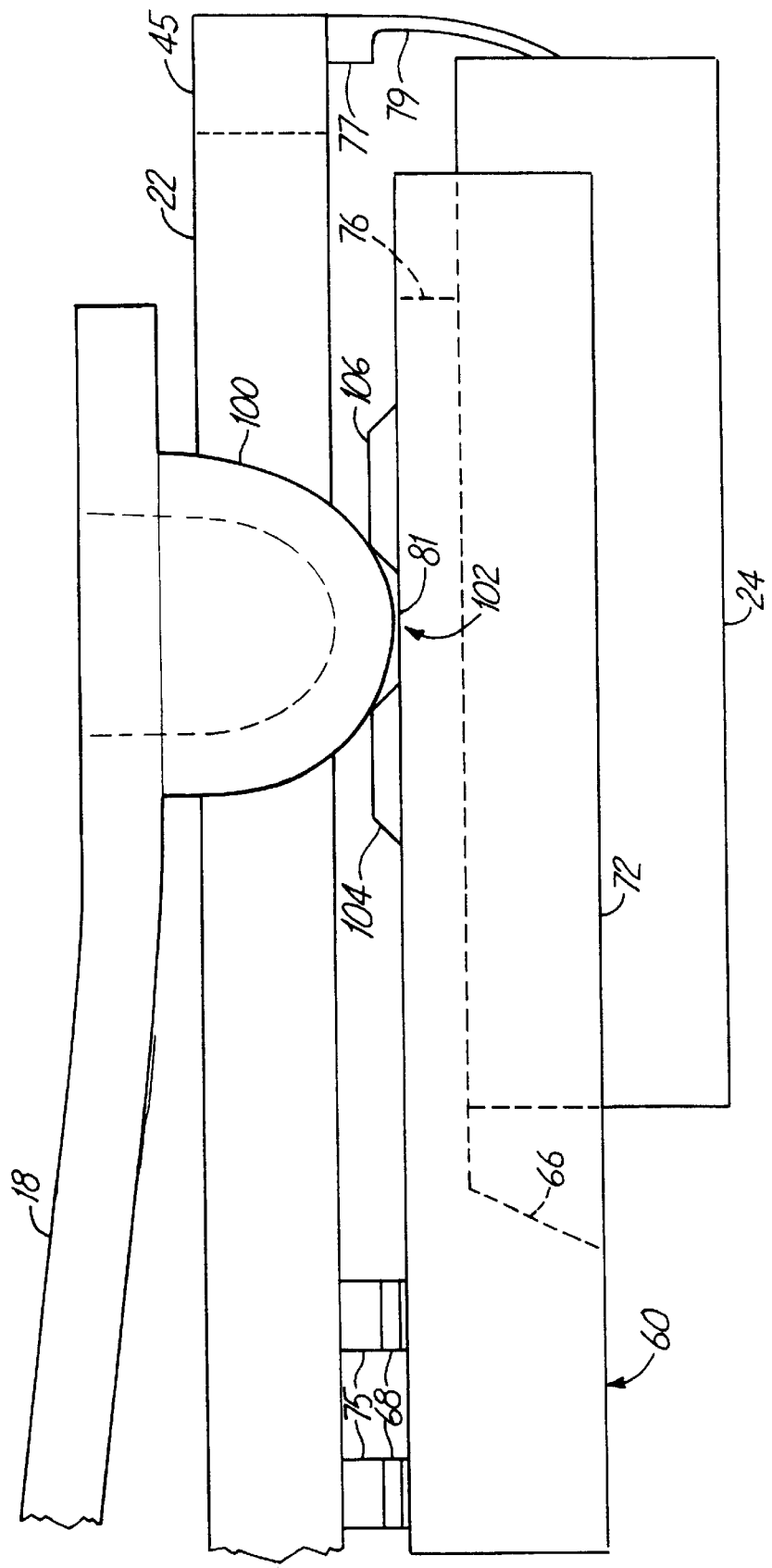

ELECTROMAGNETIC DISC DRIVE MICROACTUATOR AND SUSPENSION

CROSS-REFERENCE TO RELATED APPLICATIONS

This application is a continuation-in-part of U.S. application Ser. No. 09/010,100, filed Jan. 21, 1998, entitled "Magnetic Microactuator and Inductive Sensor Having Shaped Pole Configuration" by L. Zhang, P. Ryan and P. Crane, which in turn claims priority from Provisional Application Ser. No. 60/050,669 filed Jun. 24, 1997 entitled "Shaped-Pole Configuration for Magnetic Micro Actuator and Inductive Sensor" by L. Zhang, P. Ryan and P. Crane.

This application also claims priority from Provisional Application Ser. No. 60/061,257, filed Oct. 3, 1997 entitled "Mechanical Configuration of Electromagnetic Micro-Actuator" by L. Zhang, P. Crane and R. Resh.

Reference is hereby made to copending PCT Application No. PCT/US97/21819, filed Nov. 14, 1997, entitled "Low Mass Disc Drive Suspension" by P. Crane.

BACKGROUND OF THE INVENTION

The present invention relates to a disc drive microactuator and suspension, and more particularly to a silicon-based thin film electromagnetic microactuator and suspension providing improved performance in response to an actuation force in a disc drive system.

The density of concentric data tracks on magnetic discs continues to increase (that is, the radial spacing between data tracks is decreasing), requiring more precise radial positioning of the head. Conventionally, head positioning is accomplished by operating an actuator arm with a large-scale actuation motor, such as a voice coil motor, to radially position a head on a flexure at the end of the actuator arm. The large-scale motor lacks sufficient resolution to effectively accommodate high track-density discs. Thus, a high resolution head positioning mechanism, or microactuator, is necessary to accommodate the more densely spaced tracks.

Various microactuator locations and designs have been considered to achieve high resolution head positioning. One promising design involves inserting a silicon-based thin film structure between the suspension and the slider in a disc drive assembly. The microactuator includes, for example, an electromagnetic transducer having magnetic core materials having a stator and a rotor, with conductive coils wrapped around the stator core in a solenoid-type or planar-type configuration. One of the technical challenges in implementing such a microactuator is to provide sufficiently large actuation force to overcome friction forces and spring bias forces to accelerate the head enough to accommodate the required bandwidth. Such a design must be realized in a relatively small wafer area, to keep costs reasonable and to allow easy integration into the disc drive design. It would also be useful for the microactuator to include a position sensor to discern the relative position of the movable portion of the microactuator.

A microactuator design achieving superior actuation force in a small wafer area is disclosed in U.S. application Ser. No. 09/010,100, now U.S. Pat. No. 6,122,149, issued Sep. 19, 2000, entitled "Magnetic Microactuator and Inductive Sensor Having Shaped Pole Configuration," which is hereby incorporated by reference. There is a continuing need in the art for a microactuator suspension design to interface an improved microactuator motor such as is disclosed in U.S. application Ser. No. 09/010,100 with other disc drive components to achieve precise, high performance head positioning.

BRIEF SUMMARY OF THE INVENTION

The present invention is a disc drive having a recording disc rotatable about an axis, a slider supporting a transducing head for transducing data with the disc, and a dual-stage actuation assembly supporting the slider to position the transducing head adjacent a selected radial track of the disc. The dual stage-actuation assembly includes a movable actuator arm, a suspension assembly supported by the actuator arm and including a flexure, a slider bond pad supporting the slider, and a microactuator. The microactuator includes a rotor attached to the slider bond pad and a stator attached to the flexure and operatively connected to the rotor to radially move the rotor with respect to the stator. At least one beam is attached between the slider bond pad and the stator.

Another aspect of the invention is a disc drive having a recording disc rotatable about an axis, a slider supporting a transducing head for transducing data with the disc, and a dual-stage actuation assembly supporting the slider to position the transducing head adjacent a selected radial track of the disc. The dual stage-actuation assembly includes a movable actuator arm, a suspension assembly supported by the actuator arm and including a flexure, a tongue supporting the slider, and a microactuator. The microactuator includes a rotor attached to the tongue and a stator attached to the flexure and operatively connected to the rotor to radially move the rotor with respect to the stator. First and second cross beams are each connected between the stator and the rotor and joined to form a pivot. The tongue extends from the pivot so that the slider is radially rotatable around the pivot.

BRIEF DESCRIPTION OF THE DRAWINGS

FIG. 6A is a side view of a dimple and raceway interface between the load beam and the rotor.

DETAILED DESCRIPTION OF THE PREFERRED EMBODIMENTS

Figure 1:
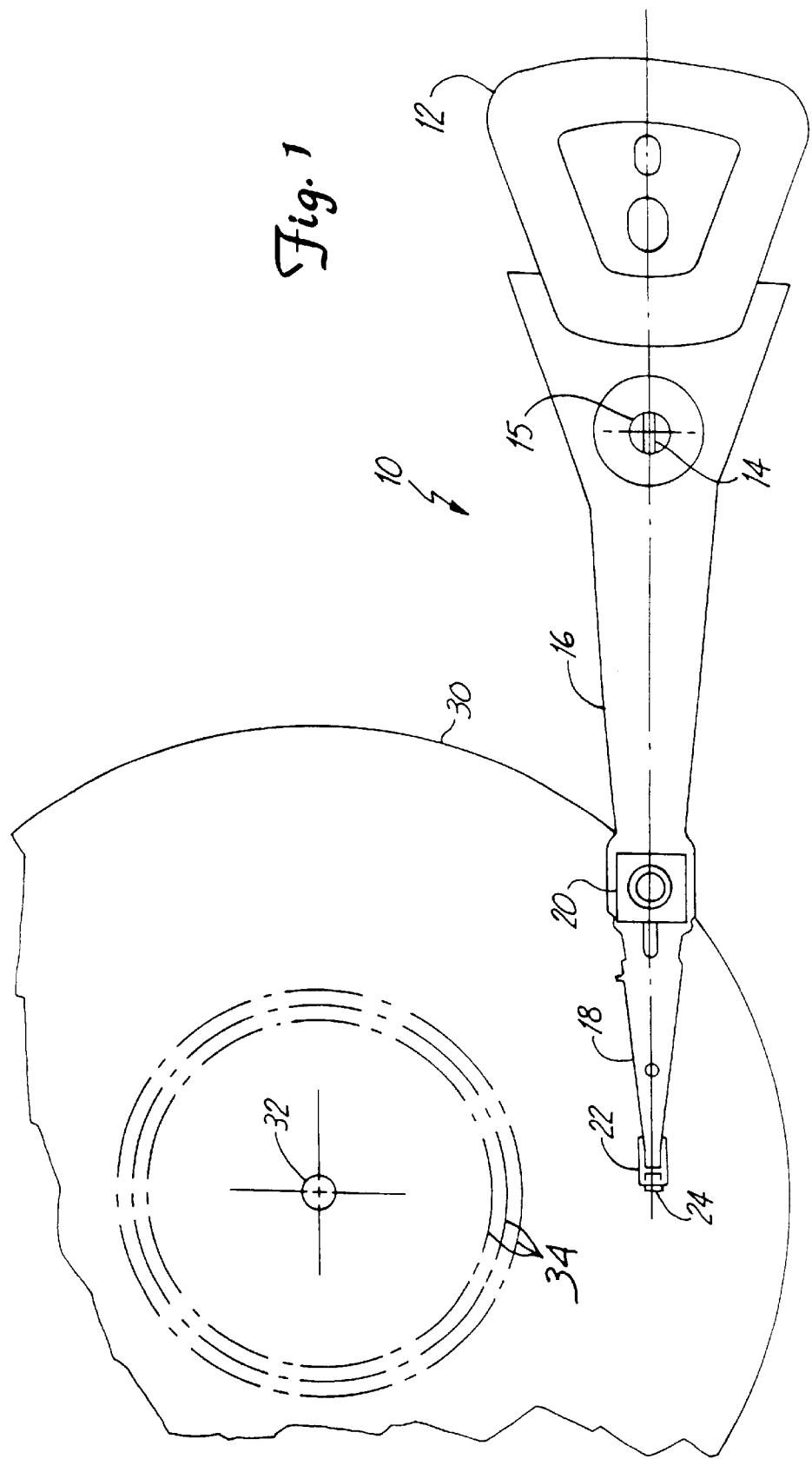
FIG. 1 is a plan view of a disc drive actuation system for positioning a slider over tracks of a disc.

FIG. 1 is a plan view of a disc drive actuation system 10 for positioning slider 24 over a selected track 34 of disc 30. Actuation system 10 includes voice coil motor (VCM) 12 arranged to rotate actuator arm 16 around axis 14 on spindle 15. Head suspension 18 is connected to actuator arm 16 at head mounting block 20. Flexure 22 is connected to an end of head suspension 18, and carries slider 24 carries a transducing head (not shown in FIG. 1) for reading and/or writing data on concentric tracks 34 of disc 30. Disc 30 rotates around axis 32, so that windage is encountered by slider 24 to keep it aloft a small distance above the surface of disc 30.

VCM 12 is selectively operated to move actuator arm 16 around axis 14, thereby moving slider 24 between tracks 34 of disc 30. However, for disc drive systems with high track density, VCM 12 lacks sufficient resolution and frequency response to position a transducing head on slider 24 precisely over a selected track 34 of disc 30. Therefore, a higher resolution actuation device is necessary.

Figure 2:
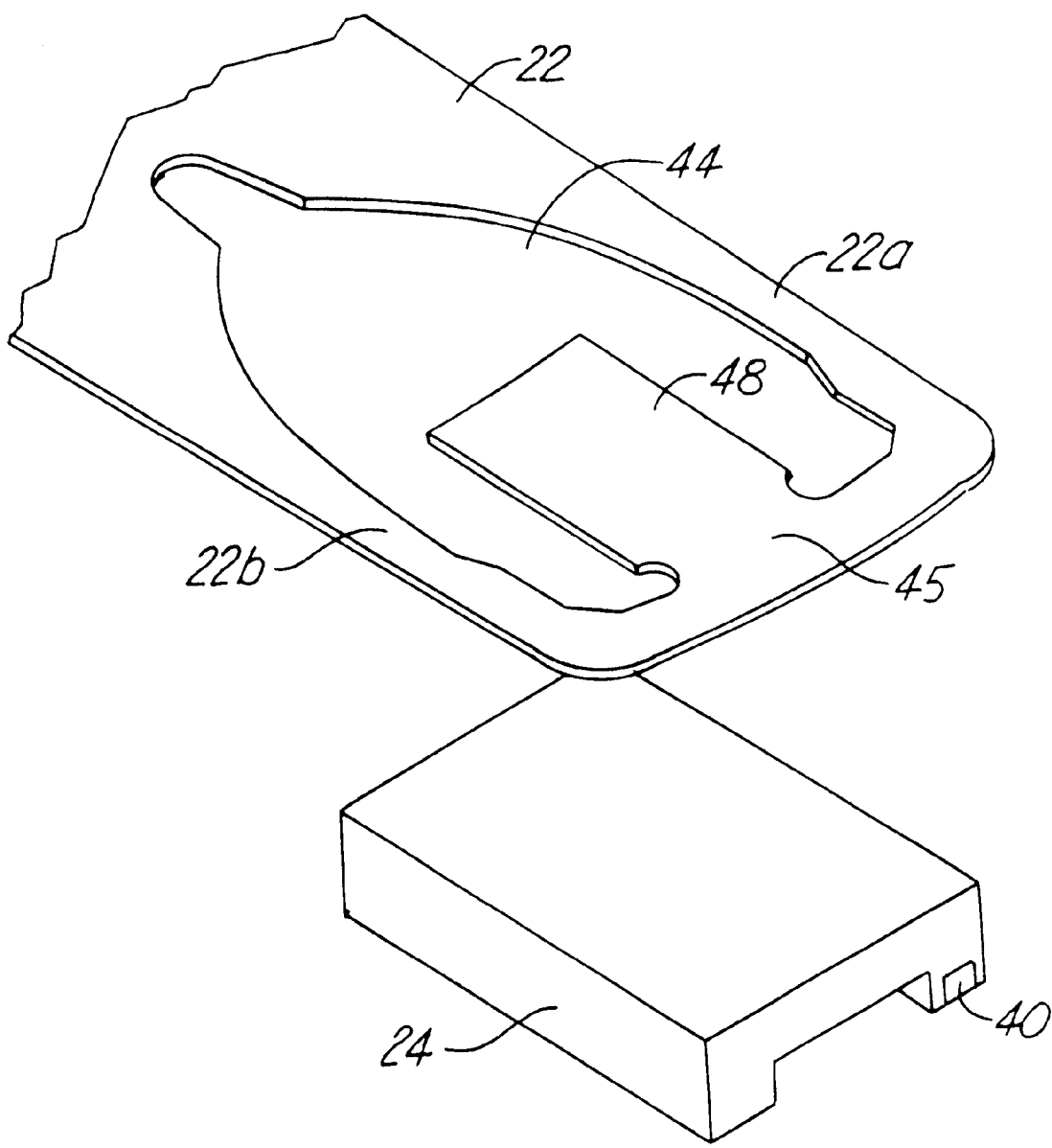
FIG. 2 is an exploded perspective view of a portion of the disc drive actuation system shown in FIG. 1, illustrating the relationship between the flexure and the slider.

FIG. 2 is an exploded perspective view of a portion of the disc drive actuation system shown in FIG. 1, showing flexure 22 and slider 24. Flexure 22 is mounted to the underside of a distal end of head suspension 18 (FIG. 1). Flexure 22 includes arms 22a and 22b forming aperture 44 therebetween to provide resilience and gimbaling spring to flexure 22. The distal end of arms 22a and 22b are connected via cross beam 45. Central tongue 48 extends from cross beam 45 into aperture 44 in a plane generally parallel to a plane defined by flexure arms 22a and 22b. The top surface of slider 24 is attached, such as by adhesive, to tongue spring 48. Flexure 22 therefore extends completely beyond slider 24.

Figure 3:
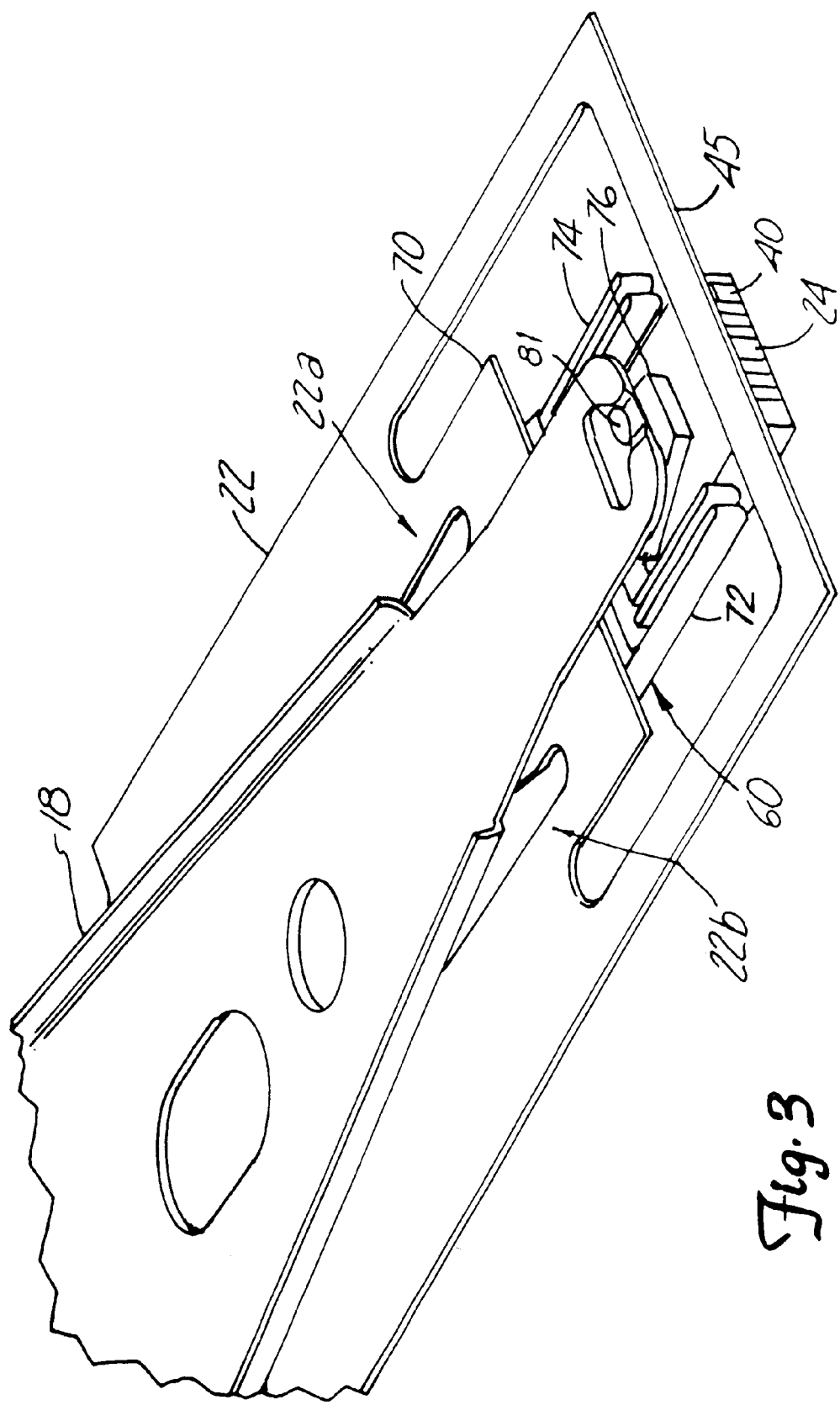
FIG. 3 is a top perspective view of a disc drive microactuation system for positioning a slider over tracks of a disc according to the present invention.
Figure 4:
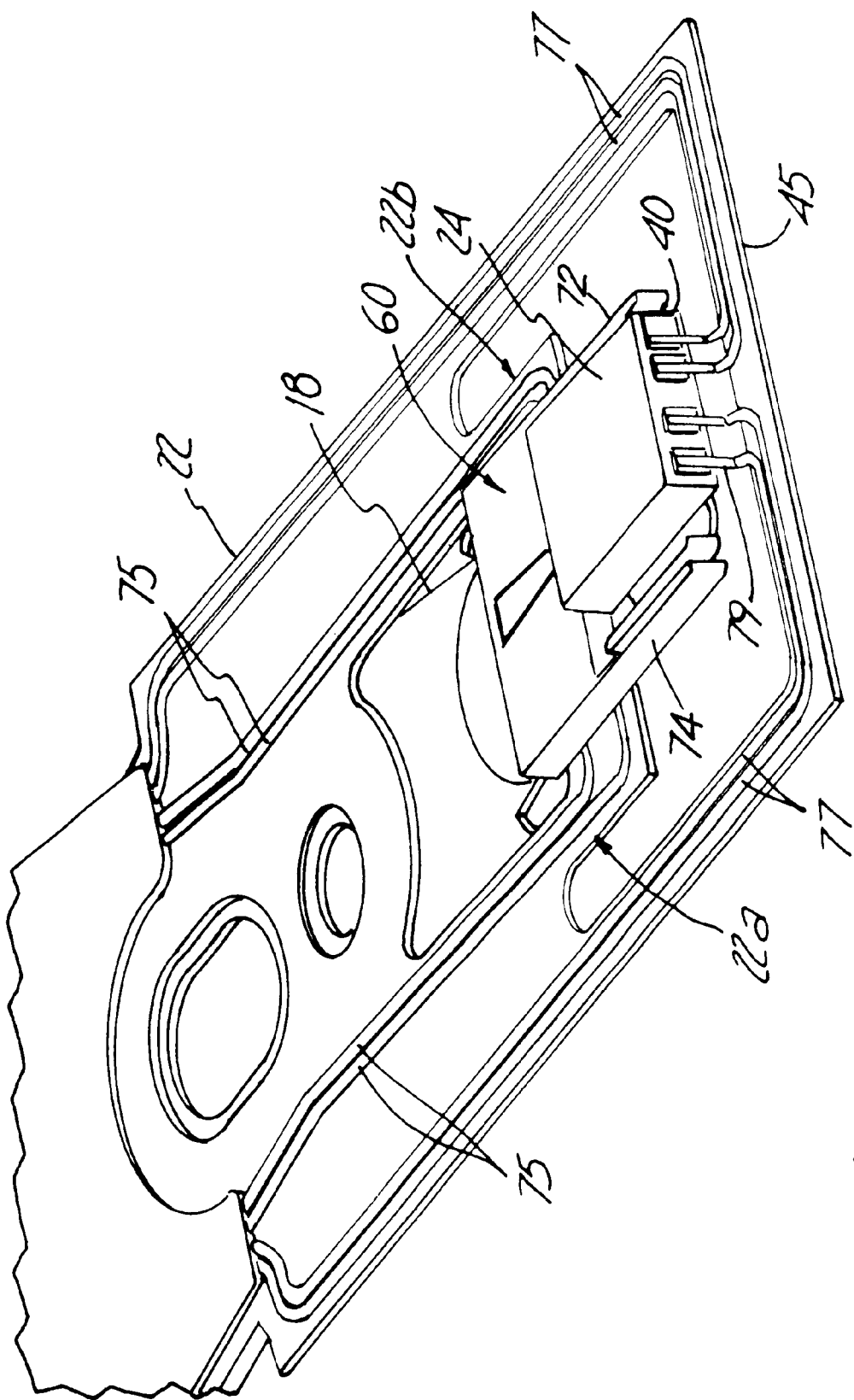
FIG. 4 is a bottom perspective view of the disc drive microactuation system shown in FIG. 3.
Figure 5:
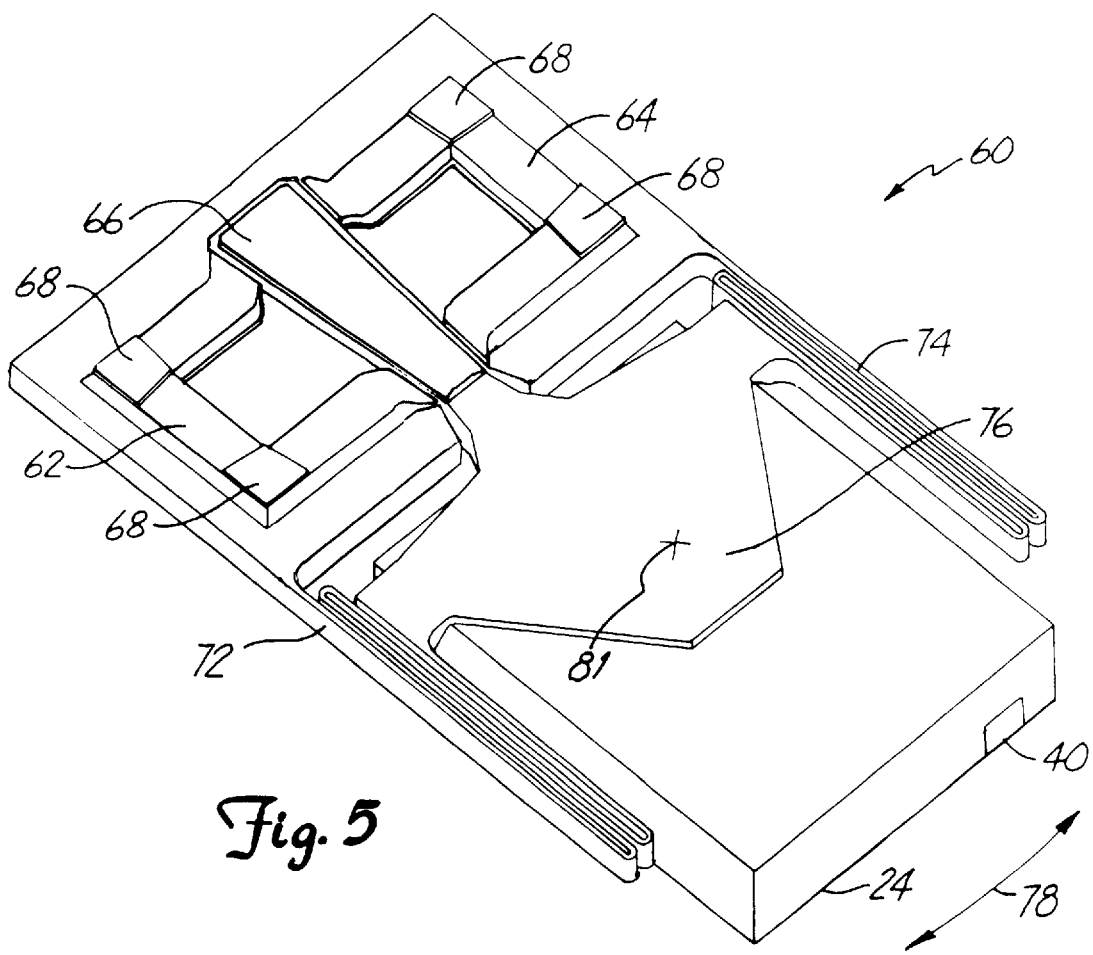
FIG. 5 is a perspective view of a microactuator configured between the flexure and the slider of the disc drive microactuation system shown in FIG. 3.

FIG. 3 is a top perspective view, and FIG. 4 is a bottom perspective view of a disc drive microactuation system for positioning slider 24 over tracks of a disc according to the present invention. FIG. 5 is a perspective view of microactuator 60 and its associated suspension configured between flexure 22 and slider 24 in the disc drive microactuation system. Flexure 22 is mounted to the underside of a distal end of head suspension 18 in a conventional manner. Flexure 22 includes arms 22a and 22b forming an aperture therebetween to provide resilience and gimbaling spring to flexure 22. Flexure 22 further includes tongue portion 70 in substantially the same plane as flexure arms 22a and 22b. The distal end of arms 22a and 22b are connected via tongue portion 70.

Microactuator 60 includes first stator 62 and second stator 64, with bond pads 68 providing access to contact first and second stators 62 and 64. Rotor 66 is formed between first and second stators 62 and 64, and is movable with respect to the stators. A "silicon suspension" is provided, including flexible arm beams 72 and 74 extending from the body of the stator portion of microactuator 60 and connecting on opposite sides to slider bonding pad 76, which is attached to a distal end of rotor 66 and attached to slider 24 by an adhesive, for example. Pre-load force is applied through slider bonding pad 76 to slider 24 at pre-load point 81. Therefore, operation of microactuator 60 translationally moves rotor 66 with respect to first and second stators 62 and 64, which in turn forces bending of arms 72 and 74 and alters the position of central tongue 76, moving transducing head with respect to flexure 22 in the direction of arrows 78, to radially position head 40 over a radial data track of a rotating disc below slider 24.

Electrical and mechanical connections to bond pads 68 are made by conductive traces 75 on the underside of flexure 22, which terminate and make contact at bond pads 68 on stators 62 and 64. Conductive traces 77 are also patterned on the underside of flexure 22 to contact transducing head 40. Electrical connections between transducing head 40 and conductive traces 77 are made by flexible conducting wires 79, to permit movement of slider 24 with respect to cross beam 45 of flexure 22. Thus, the microactuator may be readily connected to an external microactuator control circuit and transducing head 40 may be readily connected to external signal processing circuitry, both connections being provided through conductive traces or other electrical connection techniques on flexure 22.

The silicon suspension connecting the rotor and the stator of microactuator 60 is formed with two thicknesses of silicon. The first is the thickness of arm beams 72 and 74, which is typically 100–200 microns, and the second is the thickness of slider bonding pad 76, which is typically 25–50 microns. Slider bonding pad 76 may be formed with less thickness than arm beams 72 and 74 by silicon etching methods such as potassium hydroxide (KOH) wet etching, Reactive Ion Etching (RIE), or Deep Trench Reactive Ion Etching (DTRIE). The lesser thickness of slider bonding pad 76 allows slider 24 to be recessed into the silicon suspension, reducing the overall package height of microactuator 60. The low package height allows more discs to be stacked and packaged in a given disc drive form factor, increasing the total amount of data that may be stored in the disc drive.

Arm beams 72 and 74 of the silicon suspension are etched from the full silicon wafer thickness (100–200 microns), as described above. For reference purposes, a Cartesian coordinate system may be defined with a longitudinal axis roughly parallel to the length of slider 24 (parallel to the velocity of the rotating disc), a lateral or transverse axis in the "offtrack" direction roughly parallel to the width of slider 24 (normal to the disc velocity on the surface of the rotating disc), and a vertical axis roughly parallel to the height of slider 24 (normal to the surface of the rotating disc). Ideally, the silicon suspension should be compliant in the offtrack direction to allow movement due to small microactuation force, but stiff in the pitch and roll directions to maintain the alignment of the air gap between rotor 66 and stators 62 and 64 as microactuator 60 and slider 24 follow the topography of a rotating disc as a relatively rigid assembly.

In order to achieve the desired suspension stiffness characteristics, the silicon suspension must be designed according to cantilever beam theory, which defines the ratio of vertical stiffness to lateral stiffness as:

$$\frac{k_z}{k_y} = \left(\frac{h}{w}\right)^2$$

where $k_z$ and $k_y$ are the vertical and lateral stiffnesses, respectively, and h and w are the height and width of the beam, respectively. Therefore, it is apparent that the aspect ratio of beam height to beam width should be as high as practical, as high as 20 in one embodiment. This may be achieved by high resolution silicon plasma etching such as DTRIE. However, the width of a silicon beam is limited by the micro-machining process, and a reliable suspension currently requires a beam width of at least 10 microns for a wafer thickness of 100 microns or more. Aspect ratios of 10 or more are readily achievable with presently known processing techniques.

The stiffness characteristics of the silicon suspension also depend on the geometrical shape of the suspension. To achieve sufficient compliance in the offtrack direction with a cantilevered design, the beams must have a substantial length in the longitudinal direction. However, the available wafer area on which to form the beam is limited. Additionally, it is highly desirable in a microactuator design to spatially isolate the transducing head at the trailing edge of the slider from the components of the microactuator to ensure that the transducing head is not affected by any stray magnetic fields emanating from the microactuator motor. To achieve the long beam length needed for the high length-to-width aspect ratio and adequate offtrack compliance, while achieving compactness and minimizing the effects of stray magnetic fields, arm beams 72 and 74 are folded into a plurality of parallel longitudinal beams. Consequently, microactuator 60 does not extend to or beyond the trailing edge of slider 24, thereby packing a long beam into the desired wafer area.

Silicon is chosen in a preferred embodiment of the invention as the material that forms the suspension of microactuator 60. This choice is primarily driven by the well-developed etching and micro-machining techniques available to form silicon structures. However, single crystal silicon is a relatively brittle material, tending to yield catastrophically rather than deform elastically. Small scale silicon mechanical devices are typically not as fragile as their large scale counterparts because the number and size of surface, edge and bulk imperfections in the crystal are relatively small. However, it is important to minimize the stress on the silicon suspension induced by operating loads, such as the air-bearing pre-load, the electromagnetic microactuation load, and the stiction load between the slider and the disc, in order to protect against the possibility of mechanical failure.

An important factor involved in designing the microactuator and accounting for stress induced in the microactuator suspension is the application of the air-bearing pre-load force onto slider 24. Pre-load force is applied to balance the air-bearing pressurization force generated at the slider-to-disc interface, thereby maintaining slider 24 a predetermined glide height above the surface of the rotating disc. The pre-load force may be applied at several points, and the microactuator suspension design must be tailored to the choice of pre-load point. Several possibilities for application of pre-load force and associated suspension designs are discussed below.

Pre-Load Applied to the Rotor

The simplest application of pre-load force to slider 24 is induced directly to the rotor through slider bonding pad 76 as shown in FIG. 5. A conventional load beam 18 (see FIG. 1) bears on slider bonding pad at pre-load point 81. Because the pre-load force is applied to the rotor and is carried directly from the point of application through the rotor to slider 24, there is no stress induced in the silicon suspension by the pre-load force applied at point 81. Since there is no stress due to pre-loading, arm beams 72 and 74 of the silicon suspension may be made very compliant in the offtrack direction to permit movement of slider 24 by a relatively small microactuation force.

FIG. 6A is a side view of a pre-loading arrangement for use with the microactuator and suspension of the present invention. Load beams formed with dimple 100 protruding toward slider 24, to apply pre-load force through slider bonding pad 76 at pre-load point 81. Dimple 100 preferably has a height of about 6–8 milli-inches. A raceway 102 is formed on slider bonding pad 76 to receive dimple 100 and facilitate rotational movement thereof with respect to slider bonding pad 76. Raceway 102 is formed by etching raceway walls 104 and 106 on the overcoat material of slider bonding pad 76 around pre-load point 81. Raceway 102 also acts as a reservoir for lubricants such as high-temperature grease to reduce friction associated with movement of dimple 100 with respect to slider bonding pad 76.

Figure 6B:
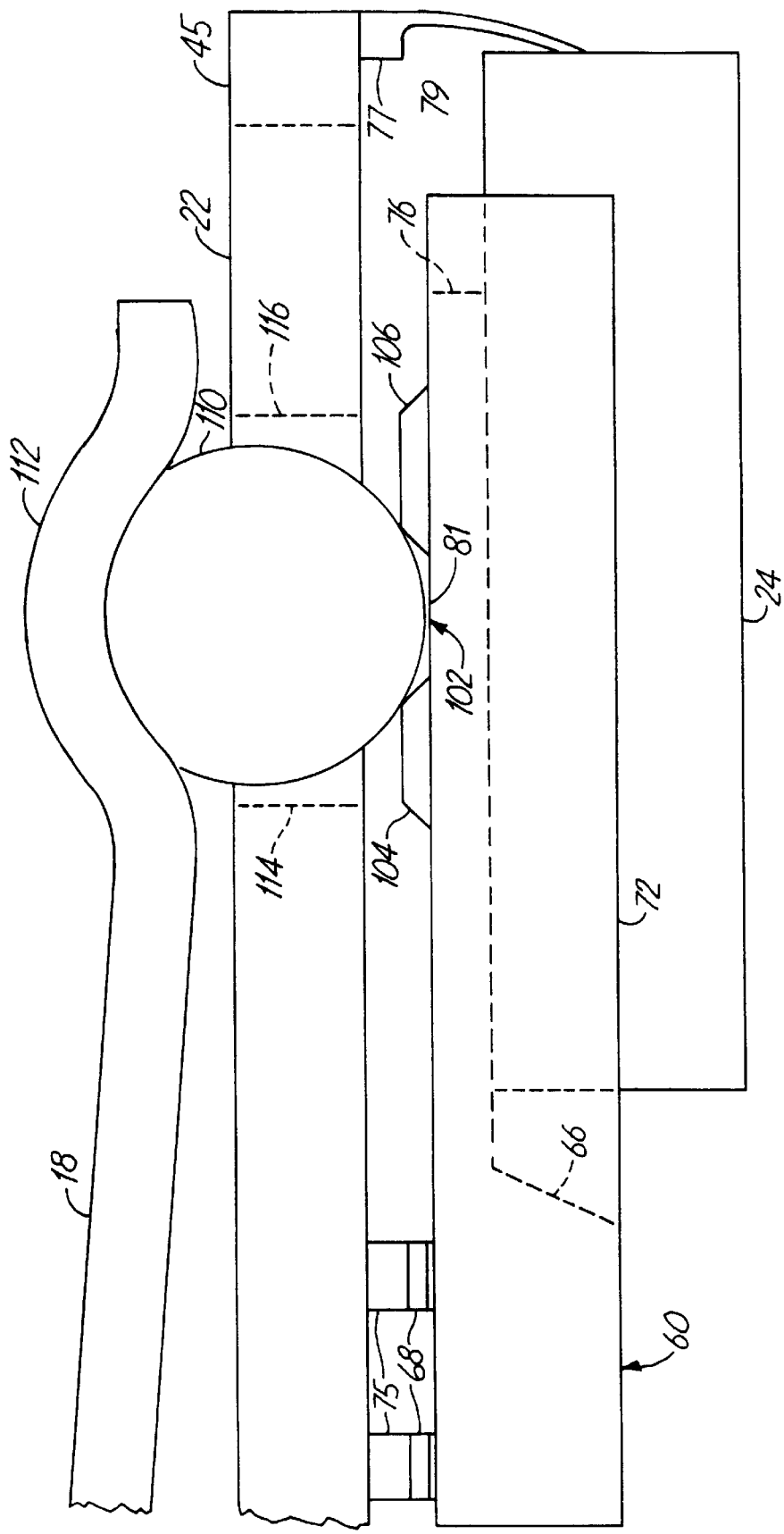
FIG. 6B is a side view of a ball and raceway interface between the load beam and the rotor.

FIG. 6B is a side view of an alternate pre-load arrangement for use with the microactuator and suspension of the present invention. Load beam 18 is formed with a curved portion 112, and raceway 102 is formed by etching raceway walls 104 and 106 on slider bonding pad 76 around pre-load point 81. A ceramic ball 110 is interposed between load beam 18 and slider bonding pad 76 in raceway 102 formed on slider bonding pad 76 and the raceway created by curved portion 112 of load beam 18. Ball 110 may be composed of silicon nitride, or may be composed of steel and coated with silicon carbide, for example. Ball 110 is preferably 8–10 milli-inches in diameter,with curved portion 112 having a height of about 2 milli-inches. Lubricants may be applied to ball 110 and/or raceway 102 to reduce friction. Walls 114 and 116 may be formed in flexure 22 to contain ball 110 and prevent it from escaping raceway 102 and the raceway formed by curved portion 112 of load beam 18.

Pre-Load Applied to Side Pads

Figure 7:
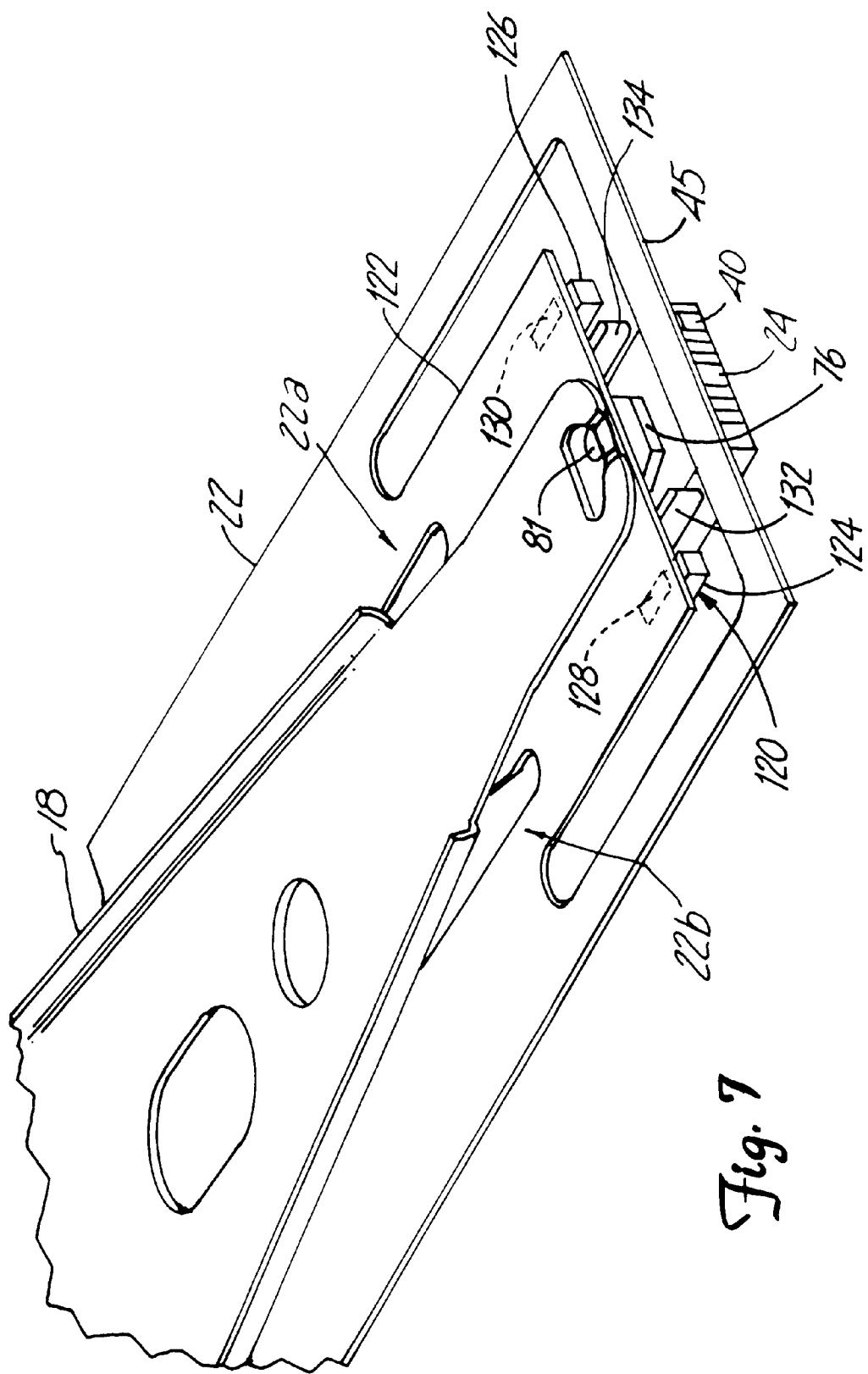
FIG. 7 is a top perspective view of a microactuator and suspension configured between the flexure and the slider of the disc drive microactuation system according to a second embodiment of the present invention.

In a second embodiment, depicted in FIG. 7, pre-load force is applied to side pads on opposite sides of slider 24. Pre-load force is applied by load beam 18 to a central bridge structure 122 of flexure 22 spanning over the surface of slider 24, so that the pre-load force is carried equally to side pads 124 and 126 through vertical abutments 128 and 130, respectively. Side pads 124 and 126 are aligned with the air-bearing center of pressure of slider 24, so that only a vertical pre-load force need be applied to bridge 122. Side pads 124 and 126 are essentially silicon extensions of the stator, remaining stationary with respect to the stator, and vertical abutments 128 and 130 are preferably posts formed on side pads 124 and 126 and later may optionally be attached to bridge structure 122 of flexure 22 by solder reflow or an alternative adhesion technique known in the art. Where pre-load force is applied to the side pads in this manner, the silicon suspension and bridge structure 122 must sustain a load of up to 4 grams of force in the vertical direction for an exemplary slider design.

Figure 8:
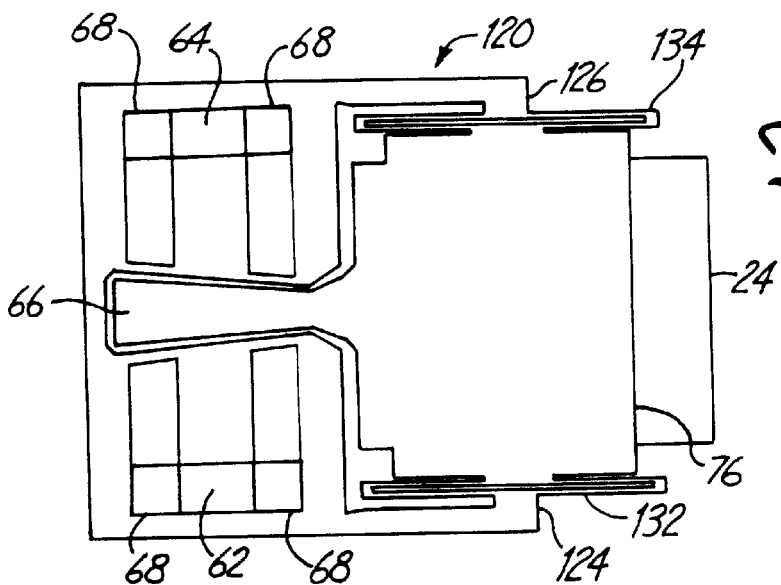
FIG. 8 is a top view of the microactuator suspension of the second embodiment of the present invention.

Microactuator suspension 120, as shown in more detail in FIG. 8, is a "crab-leg" design etched from the full thickness (i.e. approximately 100 microns), including folded beams 132 and 134 to increase the compliance of the suspension in the offtrack direction. Each longitudinal beam is connected to one another by a short beam in the offtrack direction. Prior art crab-leg-type designs have been used in other fields of art, but those designs lacked the beam thickness and the offtrack compliance to achieve the performance and stability necessary for use as a disc drive microactuator suspension.

Although the crab-leg design shown in FIGS. 7 and 8 is described for the case of pre-load force applied to side pads, a similar crab-leg suspension may be adapted and used for any pre-loading method described herein.

The crab-leg suspension design achieves several desirable performance characteristics. Its highly packed structure, extending only along a portion of the length of the slider, leaves sufficient wafer space for side pads 124 and 126 on the perimeter of the microactuator suspension. This arrangement allows the pre-load force applied by load beam 18 to transfer to slider 24 with high vertical stiffness, and provides a high degree of pitch and roll stiffness. The crab-leg design also provides high longitudinal stiffness, enabling the microactuator suspension to sustain large stiction force in the longitudinal direction.

Figure 9:
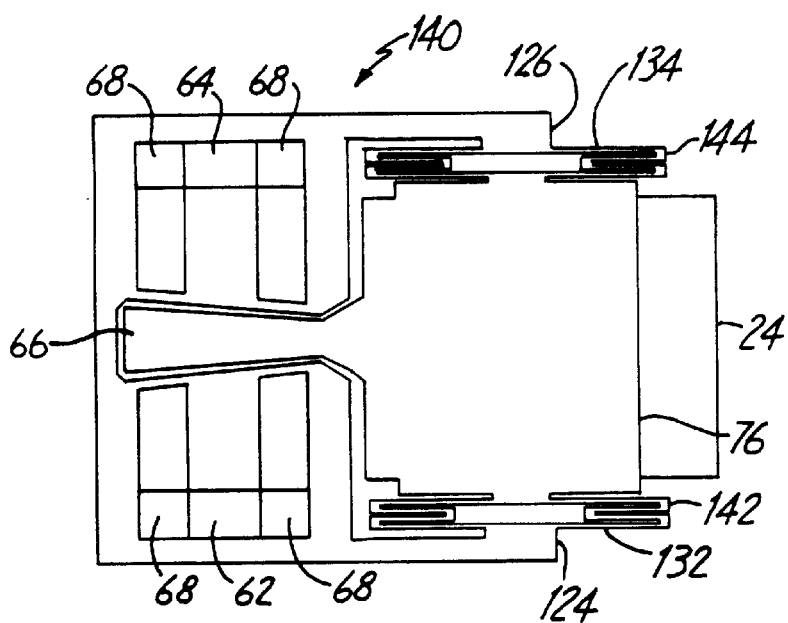
FIG. 9 is a top view of an alternative microactuator suspension of the second embodiment of the present invention.
Figure 14:
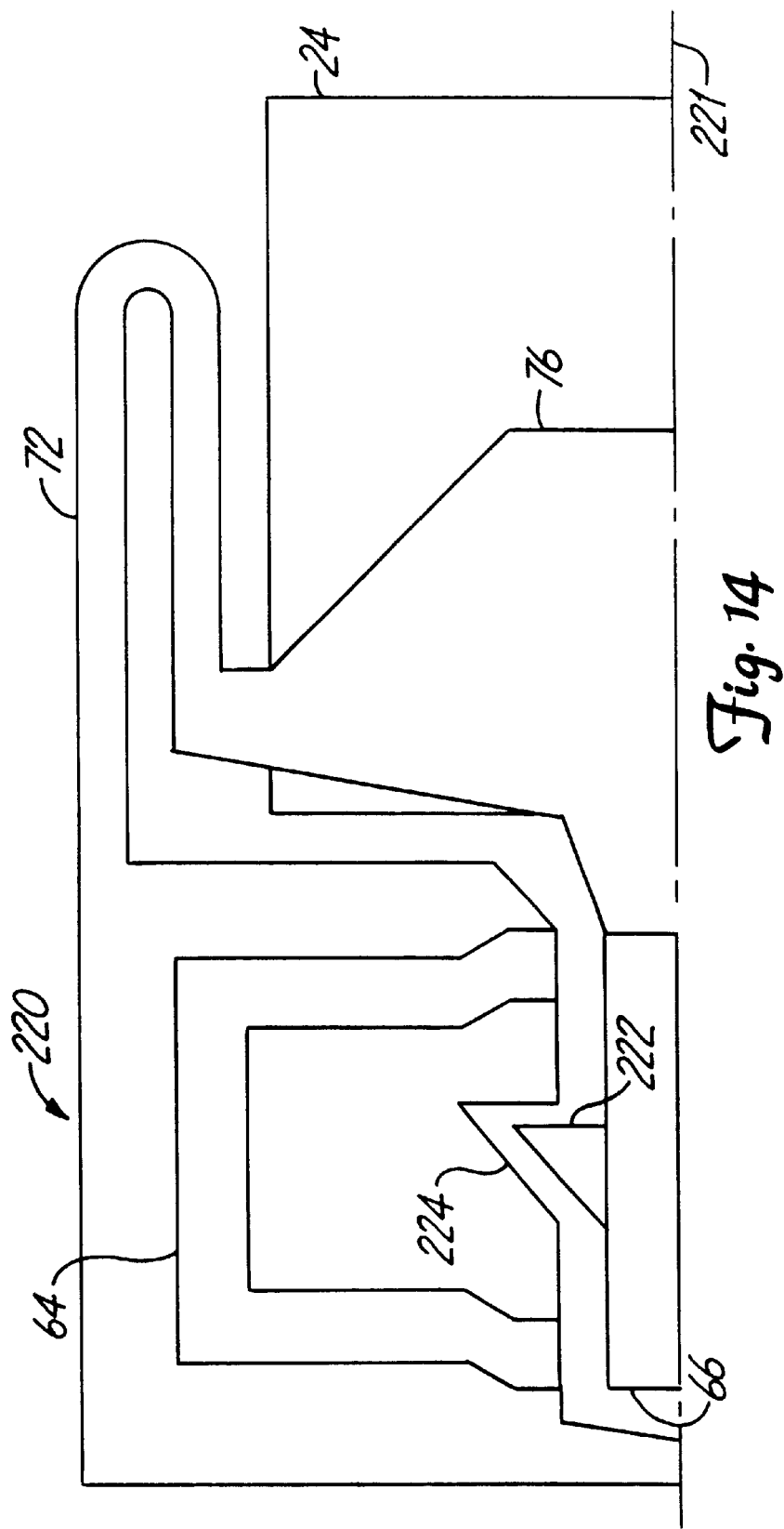
FIG. 14 is a top view of a deflection limiter for use with a microactuator according to a seventh embodiment of the present invention.

FIG. 9 shows an alternative crab-leg microactuator suspension 140, including a plurality of short finger beams 142 and 144 associated with folded beams 132 and 134, respectively, on opposite sides of slider 24. Other than the addition of finger beams 142 and 144 to folded arm beams 132 and 134, crab-leg microactuator suspension 140 is substantially similar in structure and operation to microactuator suspension 120 shown in FIGS. 7 and 8. The addition of finger beams 142 and 144 increases the effective beam length in the longitudinal direction, thereby providing the additional desired offtrack compliance for a given actual physical beam length profile. Finger beams 142 and 144 necessitate additional beam length in the offtrack direction, decreasing the longitudinal stiffness and resistance to deflection due to a longitudinal stiction load compared to microactuator 120 shown in FIGS. 7 and 8. A deflection limiter, an example of which is shown in FIG. 14 (described in detail below), may be used to remedy this situation.

Pre-Load Applied to Interconnection Bond Pads

Figure 10:
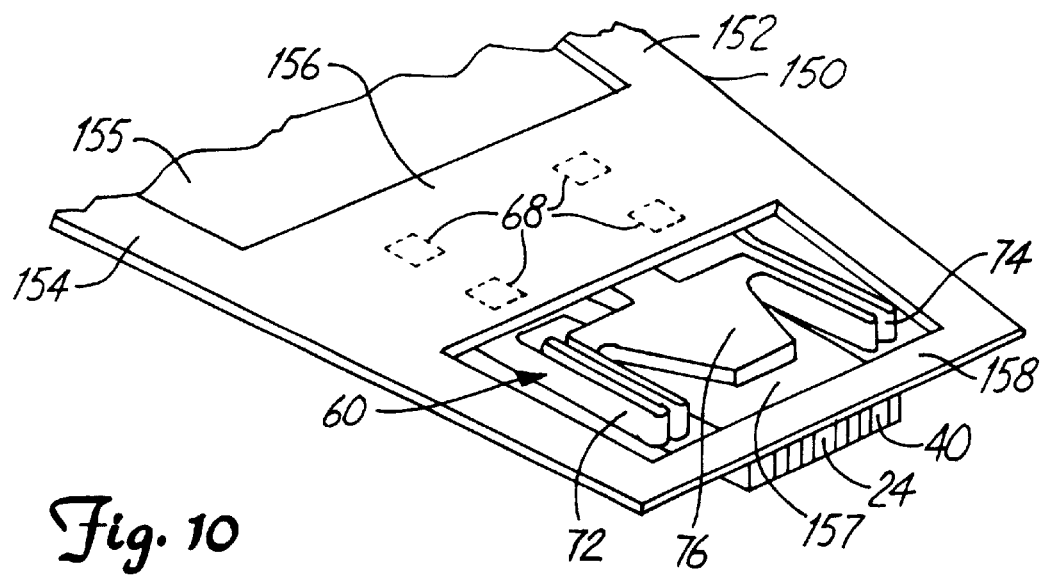
FIG. 10 is a perspective view of a disc drive microactuation system according to a third embodiment of the present invention.

In a third embodiment, depicted in FIG. 10, pre-load force is applied through a disc drive suspension connected to the microactuator at interconnecting bond pads 68. Disc drive suspension 150 is attached to actuator arm 16 (FIG. 1) at one end, and supports slider 24 at the other end. Suspension 150 is a combination load beam/flexure and includes arms 152 and 154 forming aperture 155 therebetween. Arm beams 152 and 154 are connected at an intermediate portion by cross beam 156, and at a distal end by cross beam 158, forming distal aperture 157 therebetween. Suspension 150 provides both pre-loading and gimbaling functions; pre-load force is delivered to slider 24 through cross beam 156, which is electrically and mechanically connected to microactuator bond pads 68. In a preferred version of the "pre-load applied to interconnecting bond pads" embodiment, microactuator 60 is designed with single flexible arm beams 72 and 74, thereby causing minimal misalignment of the air gaps between the stator and rotor of the microactuator under pre-loading at bond pads 68. Further details of the structure and operation of suspension 150 are disclosed in copending PCT Application No. PCT/US97/21819, entitled "Low Mass Disc Drive Suspension," which is hereby incorporated by reference.

Near-Zero Pre-Load

Figure 11:
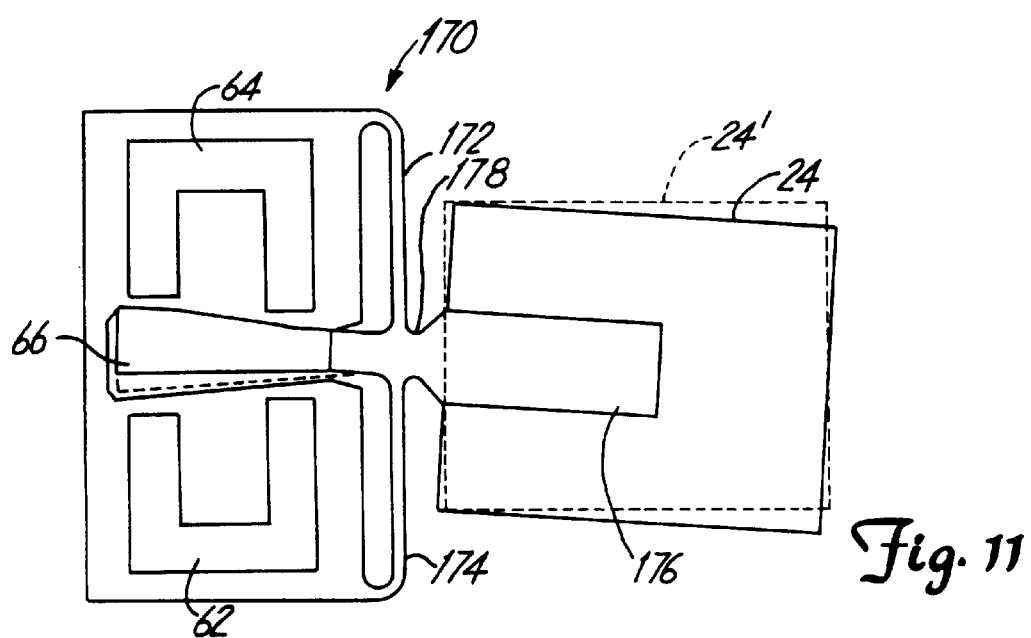
FIG. 11 is a top view of a crossed beam microactuator suspension according to a fourth embodiment of the present invention.

In a fourth embodiment, depicted in FIG. 11, nearly zero pre-load force may be practical if a self-loading or "negative pressure" air bearing slider is used, as is known in the art. For this embodiment, microactuator suspension 170 is utilized, including silicon cross beams 172 and 174 and extended slider bonding pad 176 for attachment to slider 24, all connected together at pivot 178. In operation, the rotor structure rotates around pivot 178, which is about halfway between rotor 66 and slider bonding pad 176, as indicated in FIG. 11 by the original position of rotor 66' and slider 24' and the displaced position of rotor 66 and slider 24. Thus, the air gaps between rotor 66 and stators 62 and 64 are about half of the stroke of the microactuator, increasing the force that can be generated by the microactuator and thereby increasing rotor acceleration and bandwidth.

In all of the above-described silicon suspension designs, the beams and flexible arms are preferably defined by a high resolution DTRIE process. A typical DTRIE cut width is about 10 microns, compared to a conventional diamond saw cut width of about 125 microns. The microactuators are also preferably diced from the wafer with a DTRIE process, allowing more microactuators to be closely packed together on a single wafer than with previous dicing methods.

The silicon suspension designs of the present invention require a microactuator in which the air gaps between rotor 66 and stators 62 and 64 are not of uniform width along the length of rotor 66, to allow rotation of the rotor about a given center point. For example, in the "pre-load applied to the rotor" embodiment, friction tends to resist translation of the rotor, so that the slider and attached rotor tend to rotate around pre-load point 81. In the other pre-loading embodiments, as well, the center of rotation is determined by the silicon suspension design.

When rotor 66 rotates rather than linearly translating, a non-uniform gap width is used to allow all gap areas along the length of rotor 66 to open or close by the same proportion. The gap dimension at any longitudinal coordinate along the length of rotor 66 is calculated as follows:

$$G(x) = \frac{S(x_c - x)}{(x_h - x_c)}$$

where $G(x)$ is the gap dimension at longitude x, x is the longitudinal coordinate along the rotor, S is the stroke of the microactuator (at the transducing head), $x_c$ is the x-coordinate of the center of rotation, and $x_h$ is the x-coordinate of the transducing head. In an exemplary version of the invention, where pre-load force is applied to the rotor and rotation is assumed to be about the pre-load point, the air gaps of the microactuator are laid out along rays converging at the center of rotation, i.e. pre-load point 81.

Figure 12:
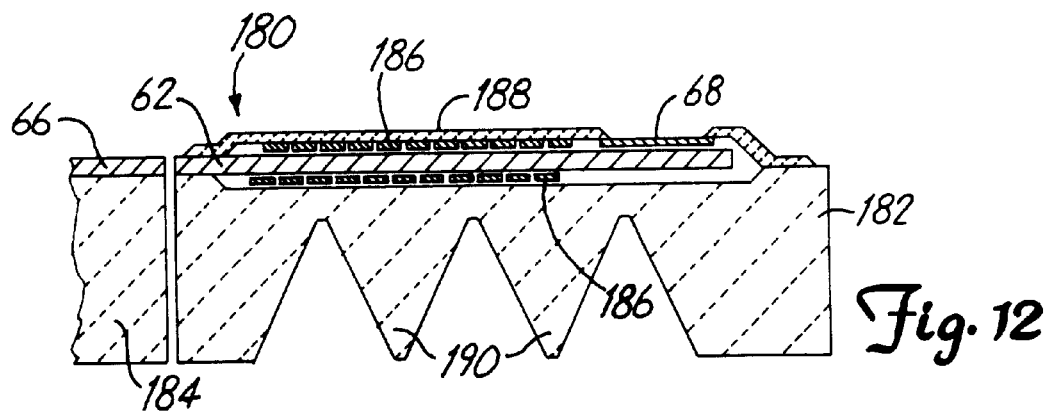
FIG. 12 is a section view of a microactuator configured with cooling fins according to a fifth embodiment of the present invention.

FIG. 12 is a section view of microactuator 180 configured with cooling fins 190 according to a fifth embodiment of the present invention. Microactuator 180 includes stator 62 with supporting substrate 182 and rotor 66 with supporting substrate 184. Coils 186 are wound around stator 62, and overcoat layer 188 is applied over coils 186, leaving bond pads 68 exposed for electrical connection. Cooling fins 190 are formed in stator substrate 182 by a high resolution process such as RIE or DTRIE, thereby presenting a larger surface area for convective cooling and dissipating the resistive heating in coils 186 with improved efficiency. Cooling fins 190 are preferably aligned parallel to the longitudinal axis of microactuator 180, so that the air flow generated by the rotating disc is directed between cooling fins 190. The generally triangular shape of cooling fins 190 in FIG. 12 results from using the RIE process to form cooling fins 190, since wall angles of the RIE process of only about 65 degrees may be obtained. If the higher resolution DTRIE process is used, wall angles approaching 90 degrees may be obtained, and cooling fins 190 would therefore be formed more rectangular in shape and with less thickness, so that a greater number of cooling fins would be formed in the same general area of stator substrate 182. RIE or DTRIE processes are also preferably utilized to form the central slider bonding pad 76 (FIG. 5) coincident with formation of cooling fins 190.

Figure 13:
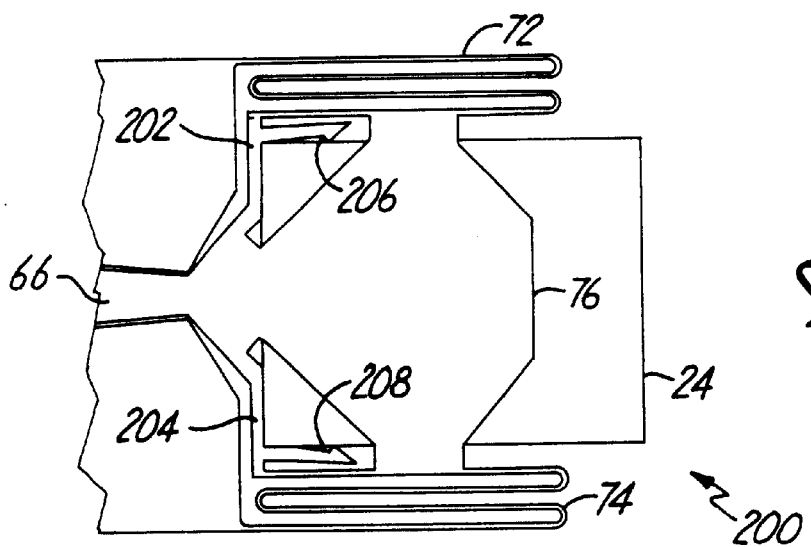
FIG. 13 is a top view of a microactuator configured with a slider bonding pad and alignment features according to a sixth embodiment of the present invention.

FIG. 13 is a top view of a microactuator 200 configured with a slider bonding pad 76 and alignment features according to a sixth embodiment of the present invention. Slider bonding pad 76 is preferably formed with a thickness of about 50 microns by RIE or DTRIE processes, for attachment to the top surface of slider 24. Stop walls 202 and 204 are formed in microactuator 200 by a high resolution DTRIE process to locate slider 24 in the longitudinal direction, and beam springs, 206 and 208 are formed in microactuator 200 by a high resolution DTRIE process to locate slider 24 in the lateral or offtrack direction. Stop walls 202 and 204 are integral with the structure connecting rotor iron 66 to slider bonding pad 76, and beam springs 206 and 208 extend from stop walls 202 and 204, respectively.

During assembly of microactuator 200, slider 24 is held in a jig fixture. Microactuator 200 is slid over slider 24 in the longitudinal direction, forcing beam springs 206 and 208 to open, providing centering force on the side surfaces of slider 24, until stop walls 202 and 204 push against the leading edge surface of slider 24. Beam springs 206 and 208 are preferably designed to have sufficient stiffness to provide centering force on sliders at the narrow end of the manufactured width distribution and sufficient strength to resist breakage when a slider at the wide end of the manufactured width distribution is inserted.

FIG. 14 is a top view of a microactuator 220 configured with a deflection limiter according to a seventh embodiment of the present invention. Half of microactuator 220 is shown in FIG. 14 (on one side of symmetry axis 221), including stator 64 and rotor 66 comprising the microactuator motor. Rotor 66 is connected to slider 24 by any of the microactuator suspensions described above. A projecting tooth 222 is formed in the substrate of rotor 66, and a coincident notch 224 is formed in the substrate of stator 64. Tooth 222 and notch 224 are preferably defined by a high resolution DTRIE process simultaneously with the formation of the silicon suspension, dicing of the wafer, and etching of slider alignment features. Tooth 222 and notch 224 are located between the poles of stator 64 so that no extra wafer area is used.

Longitudinal stiction forces may be as high as 20 grams-force (gmf) in some disc drive systems. The microactuator suspension is preferably designed to be relatively compliant in the longitudinal direction, to avoid overstressing and potential failure of the suspension, while implementing a deflection limiter such as is shown in FIG. 14. A typical microactuator suspension may deflect 10 microns before the deflection limiter makes contact and supports the stiction force, with the microactuator suspension supporting about 2.3 gmf of the force and the deflection limiter supporting the remaining 17.7 gmf of the 20 gmf longitudinal stiction load. Thus, a high stiction load may be accommodated without risking failure of the microactuator suspension.

The present invention therefore provides a microactuator suspension with desirable stiffness characteristics to interface a microactuator with other disc drive components. The microactuator suspension ensures high performance head positioning by the microactuator, and multiple applications of pre-load force to the slider may be accommodated.

Although the present invention has been described with reference to preferred embodiments, workers skilled in the art will recognize that changes may be made in form and detail without departing from the spirit and scope of the invention.

What is claimed is:

1. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:
    a movable actuator arm;
    a suspension assembly supported by the actuator arm, the suspension assembly including a flexure;
    a slider bond pad supporting the slider; and
    a microactuator comprising:
        a rotor attached to the slider bond pad;
        a stator attached to the flexure and operatively connected to the rotor to radially move the rotor with respect to the stator; and
        a plurality of beams attached between the slider bond pad and the stator.

2. The disc drive of claim 1, wherein each beam of the plurality of beams has a length greater than a length of the slider and is folded so that the beam extends along only a portion of the length of the slider.

3. The disc drive of claim 1, wherein each beam of the plurality of beams has a thickness and a width, the thickness being at least 10 times greater than the width.

4. The disc drive of claim 1, wherein the slider bond pad has a first thickness and each beam of the plurality of beams has a second thickness greater than the first thickness.

5. The disc drive of claim 4, wherein the first thickness is about 25–50 microns and the second thickness is about 100–200 microns.

6. The disc drive of claim 5, wherein each beam of the plurality of beams is formed by a high resolution Deep Trench Reactive Ion Etching (DTRIE) process.

7. The disc drive of claim 1, wherein the suspension assembly includes a load beam applying pre-load force to the slider bond pad.

8. The disc drive of claim 7, wherein the load beam includes a dimple for applying pre-load force to the slider bond pad.

9. The disc drive of claim 8, wherein the slider bond pad includes a raceway receiving the dimple on the load beam.

10. The disc drive of claim 7 further comprising a ball interposed between the load beam and the slider bond pad, the load beam including a curved portion and the slider bond pad including a raceway for receiving the ball.

11. The disc drive of claim 1, wherein the plurality of beams are composed of silicon.

12. The disc drive of claim 1, wherein the plurality of beams comprise a crab-leg design further comprising a pair of side pads on opposite sides of the slider.

13. The disc drive of claim 2, wherein the crab-leg design includes first and second beam arrangements on opposite sides of the slider, each of the first and second beam arrangements comprising a plurality of parallel arm beams and at least one finger beam interspersed between the plurality of parallel arm beams.

14. The disc drive of claim 12, wherein the flexure includes a central bridge structure spanning over the slider, and further comprising:
    vertical abutments on the side pads borne upon by the central bridge structure of the flexure; and
    a load beam applying pre-load force to the central bridge structure.

15. The disc drive of claim 14, wherein the vertical abutments are connected to the central bridge structure of the flexure.

16. The disc drive of claim 1, wherein the flexure applies pre-load force to the microactuator at the stator.

17. The disc drive of claim 1, further comprising cooling fins beneath the rotor.

18. The disc drive of claim 1, wherein the microactuator includes means for aligning the slider with respect to the stator and the plurality of beams.

19. The disc drive of claim 18, wherein the means for aligning the slider comprises at least one stop wall for longitudinal alignment and at least one beam spring for offtrack alignment of the slider.

20. The disc drive of claim 1, wherein the rotor is aligned along a ray extending to a center of rotation of the microactuator.

21. The disc drive of claim 1, wherein the microactuator includes a deflection limiter for supporting a longitudinal load on the slider.

22. A disc drive having a recording disc rotatable about an axis, a slider supporting a transducing head for transducing data with the disc, and a dual-stage actuation assembly supporting the slider to position the transducing head adjacent a selected radial track of the disc, the dual-stage actuation assembly comprising:

a movable actuator arm;

a suspension assembly supported by the actuator arm, the suspension assembly including a flexure;

a slider bond pad supporting the slider; and a microactuator comprising:

a rotor attached to the slider bond pad;

a stator attached to the flexure and operatively connected to the rotor to radially move the rotor relative to the stator; and first and second cross beams each connected between the stator and the rotor and joined to form a pivot, the slider bond pad extending from the pivot so that the slider is radially rotatable around the pivot.

23. The disc drive claim 22, wherein the slider requires less than about 0.5 grams-force (gmf) of pre-load force to maintain an operating elevation from the rotating disc.

\* \* \* \* \*